United States Patent
Hauke et al.

(10) Patent No.: US 9,582,115 B2
(45) Date of Patent: Feb. 28, 2017

(54) INTERACTION ARRANGEMENT FOR INTERACTION BETWEEN A SCREEN AND A POINTER OBJECT

(75) Inventors: Rudolf Hauke, Niederstotzingen (DE); Jens-Uwe Baeuerle, München (DE)

(73) Assignee: Almeva AG, Schweizersholz (CH)

( * ) Notice: Subject to any disclaimer, the term of this patent is extended or adjusted under 35 U.S.C. 154(b) by 734 days.

(21) Appl. No.: 12/795,267

(22) Filed: Jun. 7, 2010

(65) Prior Publication Data
US 2011/0102320 A1  May 5, 2011

Related U.S. Application Data

(63) Continuation of application No. PCT/EP2007/063340, filed on Dec. 5, 2007.

(51) Int. Cl.
*G06F 3/042* (2006.01)
*G06F 3/01* (2006.01)

(52) U.S. Cl.
CPC .............. *G06F 3/042* (2013.01); *G06F 3/011* (2013.01); *G06F 3/0421* (2013.01); *G06F 2203/04108* (2013.01)

(58) Field of Classification Search
USPC ...................... 345/156–178; 178/18.09–18.11
See application file for complete search history.

(56) References Cited

U.S. PATENT DOCUMENTS

| | | | |
|---|---|---|---|
| 5,528,263 A * | 6/1996 | Platzker et al. ............. | 345/156 |
| 5,731,805 A * | 3/1998 | Tognazzini et al. .......... | 345/156 |
| 6,091,378 A * | 7/2000 | Richardson et al. ............. | 345/7 |
| 6,256,046 B1 * | 7/2001 | Waters et al. .................. | 345/473 |
| 6,583,723 B2 * | 6/2003 | Watanabe et al. ......... | 340/573.1 |
| 6,700,669 B1 * | 3/2004 | Geng ............................ | 356/603 |
| 6,954,197 B2 | 10/2005 | Morrison et al. | |
| 7,034,807 B2 | 4/2006 | Maggioni | |
| 7,225,414 B1 | 5/2007 | Sharma et al. | |
| 8,081,158 B2 * | 12/2011 | Harris ........................... | 345/156 |
| 2001/0012001 A1 * | 8/2001 | Rekimoto et al. ............. | 345/173 |
| 2001/0020933 A1 * | 9/2001 | Maggioni ...................... | 345/156 |
| 2003/0088832 A1 * | 5/2003 | Agostinelli et al. .......... | 715/526 |

(Continued)

FOREIGN PATENT DOCUMENTS

DE  101 63 648 A1  7/2003
EP  1 420 335 A2  5/2004

(Continued)

*Primary Examiner* — Sanjiv D Patel
(74) *Attorney, Agent, or Firm* — Muncy, Geissler, Olds & Lowe, P.C.

(57) ABSTRACT

An interaction arrangement for interaction between at least one screen arranged behind a transparent pane and at least one pointer object located in front of the pane, comprising at least two cameras arranged behind the pane, wherein there is associated with each of the cameras a deflection unit by means of which at least one optical path from an interaction area in the vicinity of and in front of the pane can be directed into the camera, and comprising a computing unit connected to all of the cameras for determining a position of the pointer object which is guided so as to be visible for at least two of the cameras, wherein at least the interaction area can be stroboscopically illuminated with infrared light, and the cameras are sensitive to infrared light and can be synchronized with the stroboscopic illumination.

25 Claims, 2 Drawing Sheets

(56) References Cited

U.S. PATENT DOCUMENTS

| | | |
|---|---|---|
| 2003/0126013 A1* | 7/2003 | Shand .............................. 705/14 |
| 2003/0218760 A1* | 11/2003 | Tomasi et al. ................ 356/614 |
| 2005/0206610 A1* | 9/2005 | Cordelli ........................ 345/156 |
| 2006/0007124 A1* | 1/2006 | Dehlin .......................... 345/156 |
| 2006/0139314 A1* | 6/2006 | Bell .............................. 345/156 |
| 2006/0158435 A1 | 7/2006 | Lin et al. |
| 2006/0256083 A1* | 11/2006 | Rosenberg .................... 345/156 |
| 2008/0004950 A1* | 1/2008 | Huang et al. ................... 705/14 |
| 2008/0004953 A1* | 1/2008 | Ma et al. ........................ 705/14 |
| 2008/0062123 A1* | 3/2008 | Bell .............................. 345/156 |
| 2008/0279446 A1* | 11/2008 | Hassebrook et al. ......... 382/154 |
| 2010/0036717 A1* | 2/2010 | Trest ........................... 705/14.1 |

FOREIGN PATENT DOCUMENTS

| | | |
|---|---|---|
| EP | 1 821 184 A2 | 8/2007 |
| WO | WO 02/03316 A1 | 1/2002 |

\* cited by examiner

INTERACTION ARRANGEMENT FOR INTERACTION BETWEEN A SCREEN AND A POINTER OBJECT

This nonprovisional application is a continuation of International Application No. PCT/EP2007/063340, which was filed on Dec. 5, 2007, and which is herein incorporated by reference.

BACKGROUND OF THE INVENTION

Field of the Invention

The present invention relates to an interaction arrangement for interaction between at least one screen located behind a transparent pane and at least one pointer object located in front of the pane, comprising at least two cameras arranged behind the pane whose optical axes are oriented substantially perpendicular to the pane, wherein there is associated with each of the cameras a deflection unit via which an optical path from an interaction area in the vicinity of and in front of the pane can be directed into the camera, and comprising a computing unit connected to all of the cameras for determining a position of the pointer object which is guided so as to be visible for at least two of the cameras.

Description of the Background Art

Interactive screens are known under the name of touch-screen, in which a user moves a pointer object, for example his finger, on the screen. A position or movement of the pointer object on the screen is detected by mechanical sensors. A predefined action is triggered as a function of the position or other actions of the pointer object, for example, by pressing on a certain area of the screen. Such systems are subject to mechanical wear resulting from vandalism and scratching, and because of the resultant high maintenance costs are only suitable for long-term use under certain conditions, for example in public areas.

Consequently, systems have been developed that determine the position of the pointer object with respect to a passive surface by optical detection. U.S. Pat. No. 7,034,807 discloses an arrangement for interaction by a user with a screen through a display window. The area of the screen visible through the display window serves as a passive touch surface. The system comprises a recording unit for recording the pointer object in the vicinity of the touch surface with optical means. A computing unit connected to the recording unit can calculate a position of the pointer object in the vicinity of the contact surface from the signals recorded by the recording unit. The screen is located behind the display window, which to say that it is separated from the user by the display window. The recording unit comprises, for example, two cameras, and is also located behind the display window. By means of a deflection unit, for example mirrors or prisms, located above or below the contact surface, an optical path is directed from the recording unit to an area in front of the contact surface. In order to increase the contrast, the area in front of the contact surface is illuminated with infrared light that has the same optical path as the recording unit. Reflecting surfaces are arranged opposite the deflection unit with respect to the contact surface. They reflect the infrared light and serve as a background before which the pointer object can be detected with increased contrast. The position of the pointer object can then be determined, for example by triangulation.

Similar camera-based interactive systems are disclosed in WO 02/03316 A1, EP 1420335 A1, which corresponds to U.S. Pat. No. 6,954,197 and DE 10163648 A1, for example.

These documents teach the use of a recording unit with at least two cameras with overlapping fields of view that include a contact surface delimited by a frame. The presence of a pointer object on or in the vicinity of the contact surface is detected by analysis of the differences between two successive images of the contact surface. When a pointer object is present, the recorded image data are processed such that only selected subareas of the image are analyzed.

Conventional camera-based interactive systems have the inherent problem that the images recorded by the recording unit are frequently distorted by light from other sources, for example directly incident, scattered, or reflected light from the surroundings. Light from such external sources often has a higher intensity than light coming from the pointer object. Since the camera controller generally adjusts itself for the maximum intensity, detection of the pointer object frequently becomes difficult or impossible. Moreover, the recorded image is frequently very sensitive to changes in ambient light, for example between day and night. These circumstances lead to errors in determining the position of the pointer object.

Additional infrared illumination for illuminating the area in front of the contact surface can be used together with corresponding infrared-sensitive cameras to reduce these errors. Contrast can be further improved by means of the aforementioned reflecting surfaces. The illuminated pointer object can then be detected with higher contrast. However, this makes the system more complex and costly.

Another problem arises with double-glazed display windows between the user and screen. Light can be reflected between the window panes, reach the recording unit, and distort the recorded image, thus making it difficult or impossible to determine the position of the pointer object.

SUMMARY OF THE INVENTION

It is therefore an object of the present invention to provide an improved interaction arrangement for interaction between a screen and a pointer object.

In an embodiment, an interaction arrangement is provided for interaction between at least one screen arranged behind a transparent pane and at least one pointer object located in front of the pane and comprises at least two cameras arranged behind the pane whose optical axes are oriented, in particular, substantially perpendicular to the pane. Associated with each of the cameras is a deflection unit by means of which an optical path from an interaction area in front of the pane and in its vicinity can be directed into the camera. A computing unit connected to each of the cameras is used for determining a position of the pointer object which is guided so as to be visible for at least two of the cameras. The interaction area is stroboscopically illuminated with infrared light. The cameras are sensitive to infrared light and are synchronized with the stroboscopic illumination. Infrared illumination is not perceptible to persons standing in front of the transparent pane, but improves the contrast of the recorded images with cameras of suitable sensitivity. Conventional digital cameras are generally inherently sensitive to infrared. However, their infrared sensitivity is usually impaired by suitable infrared-absorbing filters. In an embodiment, this filter can be omitted, thereby reducing rather than increasing the costs for the camera. An advantage with stroboscopic illumination and synchronization of the cameras to the stroboscopic illumination is that an effect of variable ambient illumination on the recorded image is largely eliminated, particularly in the case of intense incident sunlight, which has high infrared content. As in the case of a flash picture with a photographic camera, a kind of instantaneous image of the pointer object is produced at the moment of illumination, so that no blurring from motion occurs and consequently the pointer object is clearly identifiable and its position at the time of the stroboscopic pulse can be precisely determined. Synchronization can be understood to mean that the stroboscopic illumination stands in a defined relationship to the exposure times of the cameras. Simultaneity is not strictly necessary. The stroboscopic pulse can be shorter than a shutter speed of the camera. The connection of the cameras to the computing unit can be direct or indirect. In the case of an indirect connection, the cameras can be connected to an FPGA (Field Programmable Gate Array), for example, from which the pictures are delivered to the computing unit.

The stroboscopic illumination can take place separately for each camera from their point of view, for example, and the exposure times of the cameras can be sequentially staggered such that a stroboscopic pulse of the illumination for one camera does not cast shadows in a recorded image of the other camera, which would make it more difficult to identify or determine the position of the pointer object.

The stroboscopic illumination can also take place at substantially or at the same time for all cameras from their point of view, so that a position determination, for example by means of triangulation, has the highest possible precision.

The transparent pane can be a display window, for example, behind which the screen is located. The deflection units can include mirrors or prisms that are located in front of the transparent pane on the optical axis of the camera. Interaction area refers to the area in front of the pane where a position or movement of the pointer object, for example a finger, should be detected. The cameras and the associated deflection units can be arranged in the corners of the transparent pane. In this case, a field of view with an aperture angle of 90° suffices for any combination of camera and deflection unit to cover the entire pane.

For the stroboscopic illumination, infrared light in the near infrared range can be use, for example, in a wavelength range between 700 nm and 1.4 μm. A wavelength of about 800 nm is especially advantageous, since thermal insulated glass, which absorbs infrared radiation above 1 μm, is frequently used for display windows.

An infrared transmission filter can be provided for each of the cameras. As a result of doing so, light in the wavelength range of daylight is filtered out, so that the function of the interaction arrangement is influenced very little or not at all by different ambient light conditions.

For the stroboscopic illumination, in an embodiment, illuminating components can be placed in the area of the camera such that an illuminating optical path can be steered, at least in the interaction area, by the deflection unit. This makes possible especially effective illumination of the pointer object, since the light used for illumination is mainly reflected in the same direction from which it is incident.

The position of the pointer object can be determined by triangulation. For this to occur, images with the pointer object are required from at least two of the cameras. The pointer object is identified and located in each image. If the camera is appropriately calibrated with the deflection unit, a position of the pointer object in the image can be used to deduce an angle at which the object is located with respect to the deflected optical axis. If these angles are determined for at least two of the cameras, the position of the pointer object relative to the camera positions can be determined with knowledge of a baseline distance between the cameras. A calibration of the camera in its installed position permits the use of economical camera optics, which do not have to meet stringent requirements with regard to imaging errors such as distortion. Calibration can take place, for example, such that, with the camera installed, a frame piece or other calibration body is held at a defined position in the visibility range of the camera or of the optical path deflected by the deflection unit, and the computing unit is informed of this position. The calibration body has points or structures that are easily identified optically; these points or structures are detected by the computing unit in the image from the camera and are used with the known position of the frame piece as a basis for correcting the distortion of the image.

Preferably, the cameras are not synchronized only with the stroboscopic illumination, but also with one another. For example, all cameras can be connected to an FPGA (Field Programmable Gate Array), where the images from the cameras are temporarily stored in frame buffers. The FPGA then transmits the time-associated images to the computing unit, for example through a USB or IEEE 1394 interface, or even undertakes a kind of preprocessing of the images, for example identification of the pointer object or determination of the position.

In another embodiment, at least one optical path from a waiting area in front of the pane, which is further away from the pane than the interaction area, can be directed through or past the deflection unit into the camera such that a person located in the waiting area is at least partly in a visibility range of the camera. In this way, characteristics or behaviors of the person can be taken into account in the interaction, for example content displayed in the screen is modified in accordance with these characteristics or behaviors. No expense is incurred for any additional camera. Alternatively, one or more additional cameras can be provided to photograph individuals who may be located in front of the pane.

The deflection unit can be designed as a beam splitter for this purpose. Beam splitters are usually implemented as semi-transparent or partially reflective mirrors, in which a part of the incident light is reflected and another part passes through the mirror. Beam splitters can also be implemented using prisms. Another possibility is to provide the deflection unit with a two-part or multi-part mirror, wherein one of the parts directs optical paths from the direction of the waiting area and another directs optical paths from the direction of the interaction area to the camera. The deflection unit can contain additional optical components, such as lenses.

In another embodiment, optical recognition of the face of a person is provided in the computing unit. From the recognized face, a number of characteristics can be extracted which can be taken into account during the interactive display of content on the screen. For example, a user profile can be created or maintained for a face that is already known in the computing unit and recognized on the basis of biometric features, in that the interests and preferences derived from the person's input are associated with the recognized person, and are taken into account in the presentation of content on the screen during a later contact.

In an embodiment, optical recognition of the pointer object, in particular of a finger, is provided in the computing unit, for example by means of pattern recognition. An algorithm that is already implemented for the recognition of the person or his or her face can be used for this purpose.

If the person is photographed by multiple cameras, a height of the person can be quantified as a characteristic by means of triangulation. From the height, a conclusion can be drawn as to whether the person is an adult or a child, for example. The presentation of the content can thus be matched to a corresponding target group.

An age of the person can also be estimated other than from the height, on the basis of facial characteristics.

Furthermore, a gender of the person can be detected as a characteristic on the basis of the face and/or height. This makes possible a gender- and age-specific presentation of content, for example clothing, cosmetics, technical items, etc.

Furthermore, it is possible to distinguish people who wear glasses from people who do not, and to address them in a targeted way through corresponding content on the screen.

With adequately precise recording of the person's face, a direction of gaze of the person's eyes with respect to the screen can be captured. Eye tracking has been used for focusing cameras for quite a long time now. In the present interaction arrangement, it is possible to determine which screen content a person directs his or her attention to, and to adapt the content accordingly, even if the person is still hesitating to actively participate in the interaction by means of a finger or pointer object.

In an embodiment, an avatar of the person can be displayed on the screen, who is created from the recorded images of the person. To this end, photos from multiple cameras are used in order to produce a three-dimensional image of the person. The avatar can, for example, be provided with virtual articles of clothing, eyeglasses, or other accessories, either automatically or through further interaction using actions performed via the pointer object, in order to give the person an impression of how these items would fit him or her and to present appropriate encouragement to purchase. The avatar can explain products to the person or can function as a virtual salesclerk.

The avatar can be displayed in mirror-imaged form. Since very few human beings are entirely symmetrical, a person's usual appearance in the mirror is often more familiar than the non-reversed appearance as seen by other persons or shown in photographs or film recordings. The mirror-imaged display can prevent unnecessary irritation of the person, particularly in a situation of trying something on.

A shield can be provided, which can suppress optical paths to the camera. Such unwanted optical paths are, for example, reflections or direct incidence of sunlight or artificial lighting. Doing so reduces distortions of the images recorded by the cameras and limitations of the dynamic range.

In another embodiment, at least one optical detector and at least one illuminating component are arranged such that at least one optical path extends from the illuminating component to the optical detector by total internal reflection between the surfaces of the transparent pane, wherein a fingerprint can be registered in the optical detector as a result of the prevention of total internal reflection when a pointer object in the form of a finger touches the pane. In this way, the person can be identified or recognized again by means of his or her fingerprint. In addition to use for a user profile or personalized functions, for example with a user login, an interaction arrangement designed in such a manner is also suitable for monitoring and locating persons.

A distance of the pointer object from the transparent pane can also be determined through capturing a mirror image of the interaction area with the mirror image of the pointer object in the transparent pane and determining a distance of the pointer object from the pointer object's mirror image. In the case of a moving pointer object, which is moved to the pane in order to click a soft key, for example, the direction of motion can be determined in a simple way from successive images without the position of the pointer object relative to the pane leading to incorrect determinations. If the distance of the pointer object from its mirror image is zero, touching of the screen is reliably detected.

With adequate resolution of the camera, provision can be made for iris recognition of the person's eyes or recognition of a bar code for identification or authentication.

Additional mechanisms for identifying the person may be provided. For example, active or passive RFID chips or mobile telephones can be recognized. Furthermore, provision can be made for a user name and password to be input through interactive operation of the screen.

Additional acoustic interaction through voice input and audio output can be provided.

Provision can be made for additional interaction with the screen via mobile telephone or PDA, for example by transmitting and/or receiving short messages (SMS) and/or multimedia messages (MMS). For example, a mechanism for communication with a mobile telephone belonging to the person can be provided through which cashless payment transactions may be carried out.

The cameras may be arranged on the screen or separately.

Cooling devices may be provided for the cameras, infrared light sources, and the screen, in order to facilitate long service life of the components even in situations with strong incident sunlight.

The infrared light sources can be narrow-band light sources, for example lasers. With such an infrared light source, especially well defined rays can be directed into the interaction area. For example, light can be projected in the manner of a grid, simplifying position determination.

The interaction arrangement can be used, for example, for the identification and tracking of persons in virtual communities (online communities), dating services, and so-called event guide systems, in which activities at one event location can be observed from another event location. In this context, the interaction can be used for the exchange of messages with other persons in these social networks.

A component for acoustic interaction can also be provided. For example, the person can give acoustic responses or commands, or the interaction system uses acoustics to announce interaction possibilities, for example by addressing persons standing in front of the display window. The component for acoustic interaction, for example, microphones and loudspeakers, can be housed within the deflection unit. However, acoustic communication is also possible over relatively short distances through the transparent pane, for example made of glass.

Interactive films can be shown on the screen.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
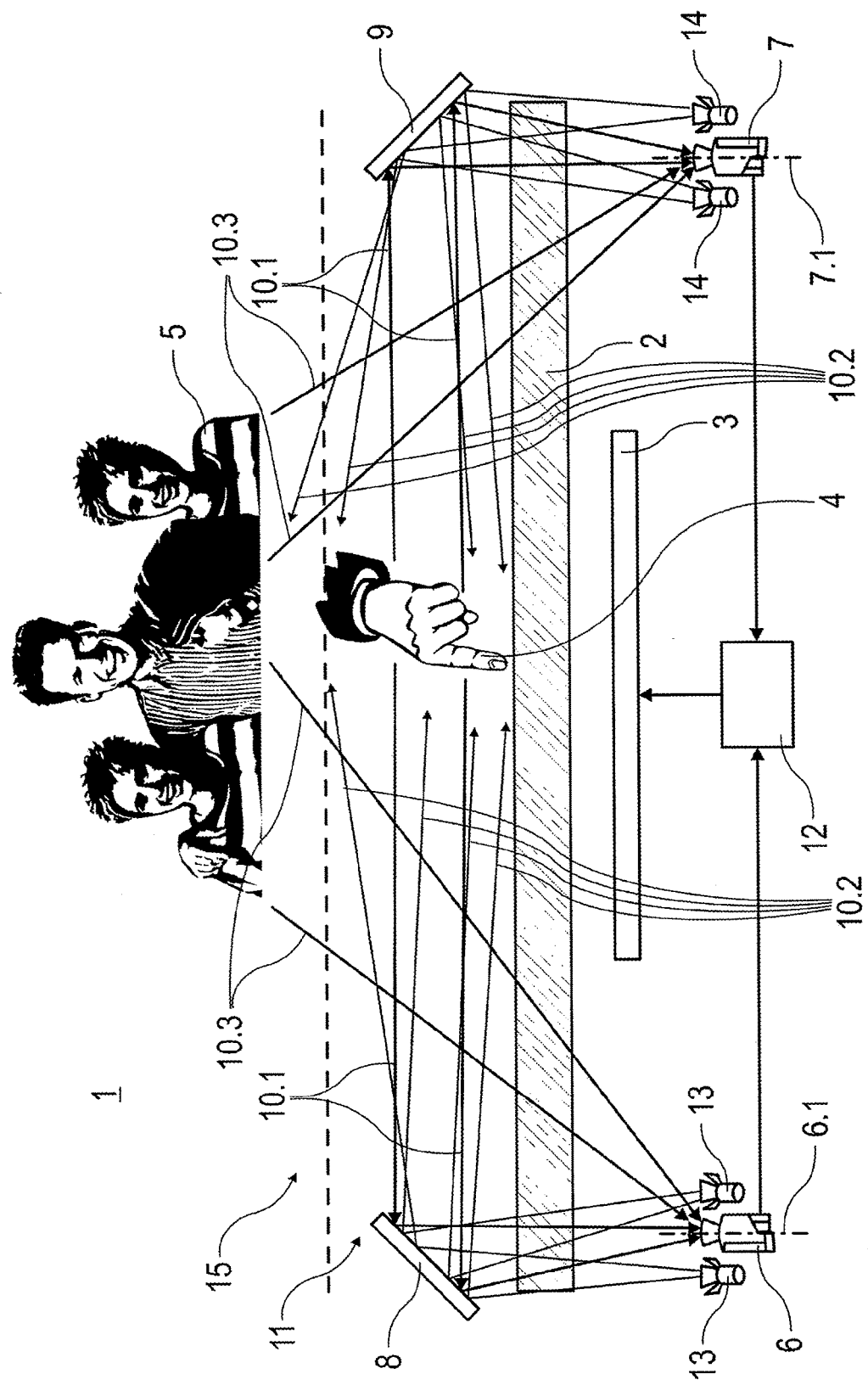
FIG. 1 illustrates an interaction arrangement for interaction between a screen arranged behind a transparent pane and a pointer object located in front of the pane.

FIG. 1 shows an interaction arrangement 1, a screen 3 arranged behind a transparent pane 2 and a pointer object 4 located in front of the pane 2 for the purpose of interaction. Displayed on the screen 3 is, for example, a menu selection or a virtual switch (soft key) that is to be actuated. A person 5 standing in front of the transparent pane 2, for example a display window, uses a finger as the pointer object 4. Two cameras 6, 7 are arranged behind the transparent pane 2 such that their optical axes 6.1, 7.1 are oriented essentially perpendicular to the transparent pane 2 in order to keep reflection to a minimum. Associated with each of the cameras 6, 7 is a deflection unit 8, 9 by means of which optical paths 10.1 from an interaction area 11 in the immediate vicinity of the pane 2 are directed into the relevant camera 6, 7.

A computing unit 12, which is connected to all of the cameras 6, 7, is used for determining a position of the pointer object 4 which is guided so as to be visible for both cameras 6, 7. Provided in the area of each of the cameras 6, 7 are infrared light sources 13, 14, with which the interaction area 11 can be stroboscopically illuminated with infrared light. The cameras 6, 7 are accordingly designed to be sensitive to infrared light and are synchronized with the stroboscopic illumination. The cameras 6, 7 and infrared light sources 13, 14 can be controlled by the computing unit 12 for this purpose. Illumination of the interaction area 11 is accomplished in that at least a part of the optical paths 10.2 is deflected by the deflection units 8, 9.

In order to determine the position of the pointer object 4, first one of the infrared light sources 13, 14 emits a light pulse and illuminates the interaction area 11 from the point of view of the associated camera 6, 7. At this point in time, this camera 6, 7 has its shutter open and takes a picture of the interaction area 11 with the pointer object 4. Once the shutter of this camera 6, 7 is closed again, the shutter of the other camera 7, 6 is opened, and a corresponding light pulse is emitted from the associated infrared light source 14, 13. The pointer object 4 is identified in both images, for example by means of a pattern recognition process, and its position is determined, for example by triangulation. The sequence of the image recordings should take place as close in time as possible so that the position of the pointer object 4 is determined with sufficient precision even during a rapid movement. The image recordings can be taken at time intervals on the order of 40 ms, for example. A movement can be determined from multiple successively determined positions of the pointer object 4. An action corresponding to the position or movement can be executed on the screen 3, and displayed content can be modified accordingly.

Additional optical paths 10.3 can be directed from a waiting area 15 in front of the transparent pane 2 that is further away from the pane 2 than the interaction area 11, past the deflection unit 8, 9 into the camera 6, 7, such that the person 5 located in the waiting area 15 is at least partly in the visibility range of the camera 6, 7. In the figure, the waiting area 15 is separated from the interaction area 11 by a dashed line.

Alternatively, the optical paths 10.3 for photographing and/or recognizing the person can also be guided through the deflection unit 8, 9. The deflection unit 8, 9 can be designed as a beam splitter for this purpose. Another possibility is to provide the deflection unit 8, 9 with a two-part or multi-part mirror, wherein one of the parts directs the optical paths 10.3 from the direction of the waiting area 15 and another part directs the optical paths 10.1 from the direction of the interaction area 11 to the camera 6, 7. The deflection unit 8, 9 can contain additional optical components, such as lenses. The interaction arrangement 1 can also be implemented without recognition of persons 5 in the waiting area 15.

A different number of cameras 6, 7 can be provided with their own deflection units 8, 9. For example, cameras 6, 7 can be arranged in four corners of a transparent pane 2 implemented as a display window.

The interaction arrangement 1 is also suitable for use in vending machines, such as ticket issuing machines.

Alternatively, the stroboscopic illumination and the shutter opening of the cameras 6, 7 can take place at the same time, so that position determination has the maximum possible precision.

The deflection units 8, 9 can include mirrors or prisms.

For the stroboscopic illumination, infrared light in the near infrared range is used, in particular.

It is preferred for a filter to be provided for each of the cameras 6, 7 which passes only wavelengths in the infrared range to the cameras 6, 7. The filter can be an infrared transmission filter or a coating applied to the deflection unit that reflects only infrared light into the camera 6, 7. The filter can be designed with an especially narrow band, for example such that only light of wavelengths from 870 nm to 880 nm is passed to the camera.

Alternatively, the infrared light sources 13, 14 can be arranged in another location, for example in the area of the deflection units 8, 9 in front of the transparent pane 2, so that their optical paths 10.2 do not have to be deflected by the deflection units 8, 9.

The cameras 6, 7 are preferably calibrated by the means that, with the camera 6, 7 installed, a frame piece or other calibration body is held at a defined position in the visibility range of the camera 6, 7 or of the optical path 10.1 deflected through the deflection unit 8, 9, and the computing unit 12 is informed of this position.

The cameras 6, 7 can be connected to an FPGA (Field Programmable Gate Array), where the images from the cameras 6, 7 are temporarily stored in frame buffers. The FPGA then transmits the time-associated images to the computing unit 12, for example through a USB or IEEE 1394 interface, or even undertakes a kind of preprocessing of the images, for example identification of the pointer object 4 or determination of the position.

Optical recognition of the face of a person 5 can be provided in the computing unit 12. From the recognized face, a number of characteristics can be extracted which can be taken into account during the interactive display of content on the screen 12. For example, a user profile can be created or maintained for a face that is already known in the computing unit 12 and recognized on the basis of biometric features, in that the interests and preferences derived from the person's 5 input are associated with the recognized person 5, and are taken into account in the presentation of content on the screen 12 during a later contact.

It is also possible for an object, such as a pen or umbrella, to be recognized as a pointer object 4. The pointer object 4, especially the finger, can be identified in the computing unit 12 by means of pattern recognition. In like manner, areas in the image with higher intensity can be identified as the probable location of the pointer object 4 with the aid of histograms.

If the person 5 is photographed by multiple cameras 6, 7, a height of the person 5 can be quantified as a characteristic by means of triangulation. From the height, a conclusion can be drawn as to whether the person 5 is an adult or a child, for example. An age of the person 5 can also be estimated other than from the height, on the basis of facial features.

Furthermore, a gender of the person 5 can be recognized as a characteristic on the basis of the face and/or height. This makes possible a gender- and age-specific presentation of content, for example clothing, cosmetics, technical items, etc.

Furthermore, it is possible to distinguish people who wear glasses from people who do not, and to address them in a targeted way through corresponding content on the screen 12.

With adequately precise recording of the face of the person 5, a direction of gaze of the person's 5 eyes with respect to the screen 12 can be captured in order to determine which content on the screen 12 the person 5 is directing his attention to, and to adapt the content accordingly.

An avatar of the person 5 can be displayed on the screen 12, who is created from the recorded images of the person 5. This avatar can, for example, be provided with virtual articles of clothing, eyeglasses, or other accessories, either automatically or through further interaction using actions performed via the pointer object 4. The avatar can be displayed in mirror-imaged form.

A shielding can be provided, which can suppress optical paths to the camera 6, 7 from reflections or direct incidence of sunlight or artificial lighting.

An optical detector and at least one illuminating component can be provided, and arranged such that at least one optical path extends from the illuminating component to the optical detector by total internal reflection between the surfaces of the transparent pane 2, wherein a fingerprint can be registered in the optical detector as a result of the prevention of total internal reflection when a pointer object 4 in the form of a finger touches the transparent pane 2.

Especially when more than two cameras 6, 7 are used, simultaneous detection of the position of more than one pointer object 4 can be provided, for example when multiple persons 5 participate in the interaction or when a person 5 uses two fingers for interaction. A positioning and spreading apart of two fingers can be interpreted by the computing unit 12 as a request to zoom in to the displayed content, for example.

More than one screen 3 can be provided behind the transparent pane 2, for example for interaction with multiple persons 5 behind a large display window. In this case, it is not necessary to have two cameras 6, 7 for each of the screens 3. Instead, multiple pointer objects 4 and/or persons 5 can be recorded simultaneously by skillful arrangement of the cameras 6, 7.

Optical paths 10.2 from the infrared light sources 13, 14 can also be guided into the waiting area in order to illuminate the person 5.

Figure 2:
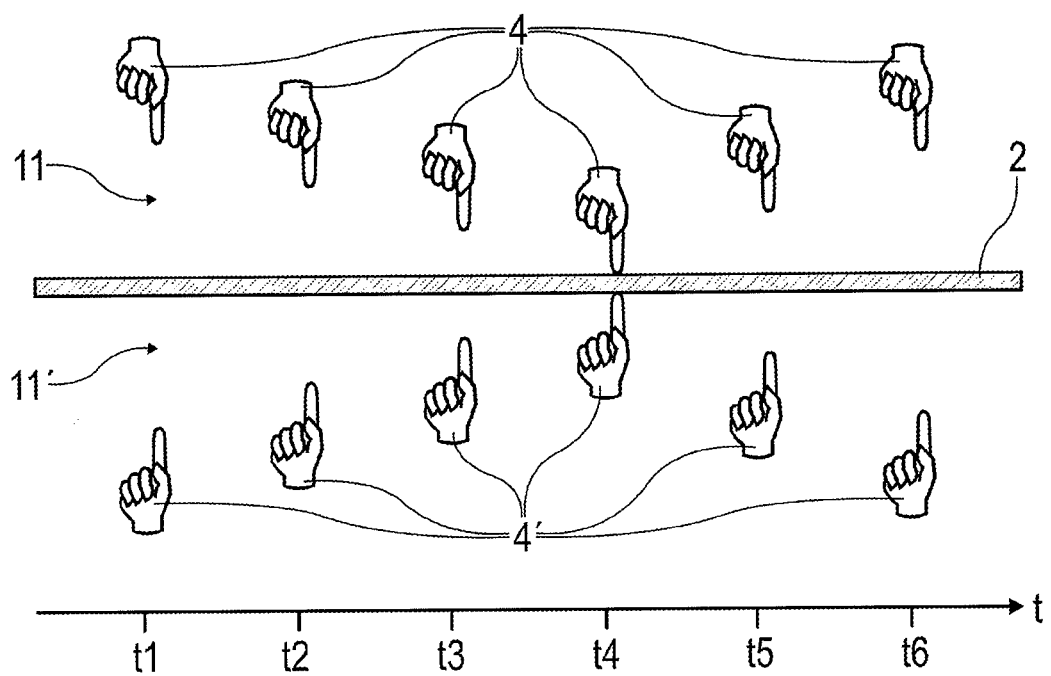
FIG. 2 illustrates path of motion of the pointer object relative to the transparent pane.

Shown in FIG. 2 is a possible path of motion of the pointer object 4 relative to the transparent pane 2 from the point of view of the camera 6, 7. As a result of the deflection unit 8, 9, the camera 6, 7 records images of the interaction area 11 as well as its mirror image 11' in the transparent pane 2, since total internal reflection occurs at the pane 2 because of the very shallow angle of view of the camera 6, 7. If the pointer object 4 is located in the interaction area 11, a mirror image 4' of the pointer object can also be seen in the mirror image 11'. A distance of the pointer object 4 from the transparent pane 2 can be ascertained by determining a distance of the pointer object 4 from the mirror image 4' of the pointer object. The figure shows the same, single pointer object 4 and its mirror image 4' over the time t, approaching the pane 2 during the points in time t1 through t3, touching the pane 2 at the time t4, and subsequently moving away from the pane 2 during the times t5 and t6. If the distance between the pointer object 4 and the mirror image 4' of the pointer object becomes zero, then touching of the pane 2 is reliably detected. A "clicking" of a soft key, link, or other content displayed on the screen 3, for example, can be recognized in this way.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An interaction arrangement configured to interact between at least one screen arranged behind a transparent pane and at least one pointer object located in front of the pane, the arrangement comprising:
    at least two cameras arranged behind the pane;
    a deflection unit associated with each of the cameras, wherein an optical path from an interaction area in a vicinity of and in front of the pane is directed into the camera via the deflection unit;
    a computing unit connectable to each of the cameras, the computing unit configured to determine a position of the pointer object that is guided so as to be visible for at least two of the cameras; and
    a narrowband infrared light source configured to illuminate the interaction area with infrared light having a grid pattern,
    wherein, at least one optical path from a waiting area in front of the pane, which is further away from the pane than the interaction area, is directed through or past the deflection unit into the camera such that a person located in the waiting area is at least partly in a visibility range of the camera, and
    wherein content displayed on a screen is modified as a function of a gesture and a characteristic of the person that has been determined.

2. The interaction arrangement according to claim 1, wherein an infrared transmission filter is provided for each of the cameras.

3. The interaction arrangement according to claim 1, wherein the position of the pointer object is determined by triangulation.

4. The interaction arrangement according to claim 1, wherein the cameras are synchronized with one another.

5. The interaction arrangement according to claim 1, wherein the deflection unit is configured as a beam splitter.

6. The interaction arrangement according to claim 1, wherein optical recognition of the pointer object via pattern recognition is provided in the computing unit.

7. The interaction arrangement according to claim 1, wherein a height of the person is quantifiable as the characteristic.

8. The interaction arrangement according to claim 1, wherein optical recognition is provided in the computing unit.

9. The interaction arrangement according to claim 8, wherein an age of the person is quantifiable as the characteristic for optical recognition based on a face and/or a height.

10. The interaction arrangement according to claim 8, wherein a gender of the person is recognizable as the characteristic for optical recognition based on a face and/or a height.

11. The interaction arrangement according to claim 8, wherein eyeglasses worn by a person is recognizable as the characteristic for optical recognition.

12. The interaction arrangement according to claim 8, wherein a direction of gaze of eyes of a person with respect to a screen is captured.

13. The interaction arrangement according to claim 1, wherein the content displayed on the screen is modified as a function of a behavior of the pointer object or of the person.

14. The interaction arrangement according to claim 13, wherein an avatar of the person is displayed on the screen.

15. The interaction arrangement according to claim 14, wherein the avatar is displayed in mirror-imaged form.

16. The interaction arrangement according to claim 1, further comprising a shield via which unwanted optical paths to the cameras are suppressed.

17. The interaction arrangement according to claim 1, wherein the content displayed on the screen is modified as a function of a behavior of the person.

18. The interaction arrangement according to claim 1, wherein infrared light in a wavelength range between 700 nm and 1.4 µm is provided for the stroboscopic illumination.

19. The interaction arrangement according to claim 1, wherein the at least two cameras are devoid of infrared absorbing filters.

20. The interaction arrangement according to claim 8, wherein a user profile is created based on the optical recognition.

21. The interaction arrangement according to claim 1, wherein the waiting area is illuminated with infrared light.

22. An interaction arrangement configured to interact between at least one screen arranged behind a transparent pane and at least one pointer object located in front of the pane, the arrangement comprising:

at least two cameras arranged behind the pane;

a deflection unit associated with each of the cameras, wherein an optical path from an interaction area in a vicinity of and in front of the pane is directed into the camera via the deflection unit; and a computing unit connectable to each of the cameras, the computing unit configured to determine a position of the pointer object that is guided so as to be visible for at least two of the cameras, wherein, at least one optical path from a waiting area in front of the pane, which is further away from the pane than the interaction area, is directed through or past the deflection unit into the camera such that a person located in the waiting area is at least partly in a visibility range of the camera, wherein at least the interaction area is stroboscopically illuminated with infrared light in a grid pattern, and wherein the cameras are sensitive to infrared light and are synchronizable with the stroboscopic illumination, and wherein content displayed on a screen is modified as a function of a gesture and a characteristic of the person that has been determined.

23. The interaction arrangement according to claim 22 wherein infrared light in the near infrared range is provided for the stroboscopic illumination.

24. The interaction arrangement according to claim 22, wherein an optical path of the at least two cameras is different from an optical path of the infrared light.

25. The interaction arrangement according to claim 22 wherein infrared light in a wavelength range about 800 nm is provided for the stroboscopic illumination.

* * * * *